United States Patent
Park et al.

(10) Patent No.: US 10,084,183 B2
(45) Date of Patent: *Sep. 25, 2018

(54) SILICON OXIDE-CARBON COMPOSITE AND METHOD OF MANUFACTURING THE SAME

(71) Applicant: LG CHEM, LTD., Seoul (KR)

(72) Inventors: Cheol Hee Park, Daejeon (KR); Han Nah Jeong, Daejeon (KR); Sang Yun Jung, Daejeon (KR); Byung Kyu Lim, Daejeon (KR); Yong Ju Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 464 days.

This patent is subject to a terminal disclaimer.

(21) Appl. No.: 14/109,611

(22) Filed: Dec. 17, 2013

(65) Prior Publication Data

US 2014/0106231 A1    Apr. 17, 2014

Related U.S. Application Data

(63) Continuation of application No. PCT/KR2013/009212, filed on Oct. 15, 2013.

(30) Foreign Application Priority Data

Oct. 16, 2012  (KR) .................. 10-2012-0114841
Oct. 14, 2013  (KR) .................. 10-2013-0122146

(51) Int. Cl.
*H01M 4/36* (2006.01)
*C01B 33/113* (2006.01)
(Continued)

(52) U.S. Cl.
CPC ............. *H01M 4/366* (2013.01); *C01B 31/02* (2013.01); *C01B 33/113* (2013.01);
(Continued)

(58) Field of Classification Search
CPC .. H01M 4/366; H01M 4/0421; H01M 4/0471; H01M 4/0497; H01M 4/134; H01M 4/1395; H01M 4/386; H01M 4/625
See application file for complete search history.

(56) References Cited

U.S. PATENT DOCUMENTS

| | | | |
|---|---|---|---|
| 9,139,441 B2 * | 9/2015 | Anguchamy | ......... H01M 4/134 |
| 2003/0118905 A1 | 6/2003 | Fukuoka et al. | |

(Continued)

FOREIGN PATENT DOCUMENTS

| | | | |
|---|---|---|---|
| JP | 2003192327 | * | 7/2003 |
| JP | 2011-142021 | | 7/2011 |

(Continued)

OTHER PUBLICATIONS

Yong Kong et al., "Facile synthesis of resorcinol-formaldehyde/silica composite aerogels and their transformation to monolithic carbon/silica and carbon/silicon carbide composite aerogels", Journal of Non-Crystalline Solids, vol. 358, No. 23, Oct. 5, 2012, pp. 3150-3155.

*Primary Examiner* — Ula C Ruddock
*Assistant Examiner* — Thomas H. Parsons
(74) *Attorney, Agent, or Firm* — Dentons US LLP

(57) ABSTRACT

Provided are a silicon oxide-carbon composite and a method of manufacturing the same. More particularly, the present invention provides a method of manufacturing a silicon oxide-carbon composite including mixing silicon and silicon dioxide to be included in a reaction chamber, depressurizing a pressure of the reaction chamber to obtain a high degree of vacuum while increasing a temperature in the reaction chamber to a reaction temperature, reacting the mixture of silicon and silicon dioxide in a reducing atmosphere, and (Continued)

coating a surface of silicon oxide manufactured by the reaction with carbon, and a silicon oxide-carbon composite manufactured thereby.

8 Claims, 2 Drawing Sheets

(51) Int. Cl.
| | |
|---|---|
| *C01B 31/02* | (2006.01) |
| *H01M 4/48* | (2010.01) |
| *H01M 4/04* | (2006.01) |
| *H01M 4/134* | (2010.01) |
| *H01M 4/1395* | (2010.01) |
| *H01M 4/38* | (2006.01) |
| *H01M 4/62* | (2006.01) |
| *C01B 33/18* | (2006.01) |
| *H01M 4/485* | (2010.01) |
| *H01M 4/587* | (2010.01) |
| *H01M 10/052* | (2010.01) |

(52) U.S. Cl.
CPC ......... *C01B 33/181* (2013.01); *H01M 4/0421* (2013.01); *H01M 4/0471* (2013.01); *H01M 4/134* (2013.01); *H01M 4/1395* (2013.01); *H01M 4/386* (2013.01); *H01M 4/483* (2013.01); *H01M 4/485* (2013.01); *H01M 4/587* (2013.01); *H01M 4/625* (2013.01); *H01M 10/052* (2013.01)

(56) References Cited

U.S. PATENT DOCUMENTS

| | | |
|---|---|---|
| 2009/0239151 A1 | 9/2009 | Nakanishi et al. |
| 2011/0052475 A1* | 3/2011 | Barati ............... C01B 33/023 423/350 |
| 2013/0052508 A1* | 2/2013 | Kim ................... H01M 4/483 429/126 |
| 2013/0244106 A1 | 9/2013 | Chang et al. |

FOREIGN PATENT DOCUMENTS

| | | | |
|---|---|---|---|
| JP | 2011142021 | * | 7/2011 |
| KR | 10-2005-0087147 | | 8/2005 |
| KR | 10-0812302 | | 3/2008 |
| KR | 10-2009-0099487 | | 9/2009 |
| KR | 10-2012-0093764 | | 8/2012 |
| KR | 10-1201807 | | 11/2012 |

* cited by examiner

SILICON OXIDE-CARBON COMPOSITE AND METHOD OF MANUFACTURING THE SAME

This application is a bypass continuation of International Application No. PCT/KR2013/009212, filed Oct. 15, 2013, and claims priority to and the benefit of Korean Patent Application Nos. 10-2012-0114841, filed on Oct. 16, 2012, and 10-2013-0122146, filed on Oct. 14, 2013, the disclosure of which are incorporated herein by reference.

TECHNICAL FIELD

The present invention relates to a silicon oxide-carbon composite and a method of manufacturing the same.

BACKGROUND ART

A lithium secondary battery is an energy storage device in which electrical energy is stored in the battery while lithium moves from an anode to a cathode during a discharge process and lithium ions move from the cathode to the anode during charging. When compared to other batteries, lithium secondary batteries have higher energy density and lower self-discharge rate, and thus, the lithium secondary batteries have been widely used in various industries.

Components of a lithium secondary battery may be classified as a cathode, an anode, an electrolyte, and a separator. Lithium metal was used as an anode active material in an early lithium secondary battery. However, since safety concerns may occur as charge and discharge are repeated, lithium metal has been replaced with a carbon-based material, such as graphite. Since a carbon-based anode active material may have an electrochemical reaction potential with lithium ions that is similar to lithium metal and changes in a crystal structure may be small during continuous intercalation and deintercalation processes of lithium ions, continuous charge and discharge may be possible. Therefore, excellent charge and discharge lifetime may be provided.

However, techniques for developing anode active materials with high capacities and high power have been required as the lithium secondary battery market has recently expanded from small-sized lithium secondary batteries used in portable devices to large-sized secondary batteries used in vehicles. Therefore, development of non-carbon-based anode active materials such as materials based on silicon, tin, germanium, zinc, and lead, having a higher theoretical capacity than a carbon-based anode active material has been conducted.

The above anode active materials may increase energy density by improving charge and discharge capacity. However, since dendrites or a non-conductive compound may be generated on an electrode as the charge and discharge are repeated, charge and discharge characteristics may degrade or expansion and shrinkage may increase during the intercalation and deintercalation of lithium ions. Therefore, with respect to secondary batteries using the above anode active materials, retention of discharge capacity (hereinafter, referred to as "lifetime characteristics") according to the repeated charge and discharge may be insufficient, and a ratio of initial discharge capacity to initial charge capacity after manufacturing (discharge capacity/charge capacity; hereinafter, referred to as "initial efficiency") may also be insufficient.

DISCLOSURE OF THE INVENTION

Technical Problem

The present invention provides a silicon oxide-carbon composite in which an amount of oxygen in silicon oxide is controlled and a surface of the silicon oxide is coated with carbon.

Technical Solution

According to an aspect of the present invention, there is provided a method of manufacturing a silicon oxide-carbon composite including mixing silicon and silicon dioxide to be included in a reaction chamber; depressurizing a pressure of the reaction chamber to obtain a high degree of vacuum while increasing a temperature in the reaction chamber to a reaction temperature; reacting the mixture of silicon and silicon oxide in a reducing atmosphere; and coating a surface of silicon oxide manufactured by the reaction with carbon.

According to another aspect of the present invention, there is provided a silicon oxide-carbon composite including silicon oxide and a carbon coating layer on a surface of the silicon oxide, wherein a ratio of a maximum height ($h_2$) of a peak in a 2 theta range of 40° to 60° to a maximum height ($h_1$) of a peak in a 2 theta range of 15° to 40° in a X-ray diffraction (XRD) pattern satisfies $0.40 \leq h_2/h_1 \leq 1.5$.

Advantageous Effects

According to the present invention, since an amount of oxygen in silicon oxide may be controlled by creating a reducing atmosphere and controlling a pressure, silicon oxide having a low amount of oxygen may be obtained. Thus, electrical conductivity may be further improved by forming a carbon coating layer on a surface of the silicon oxide having a low amount of oxygen.

Also, an initial efficiency of a secondary battery may be predicted by calculating a height ratio in a specific range of 2 theta in a X-ray diffraction pattern of the silicon oxide-carbon composite.

MODE FOR CARRYING OUT THE INVENTION

The present invention provides a method of manufacturing a silicon oxide-carbon composite including mixing silicon and silicon dioxide to be included in a reaction chamber, depressurizing a pressure of the reaction chamber to obtain a high degree of vacuum while increasing a temperature in the reaction chamber to a reaction temperature, reacting the mixture of silicon and silicon dioxide in a reducing atmosphere, and coating a surface of silicon oxide manufactured by the reaction with carbon.

Figure 1:
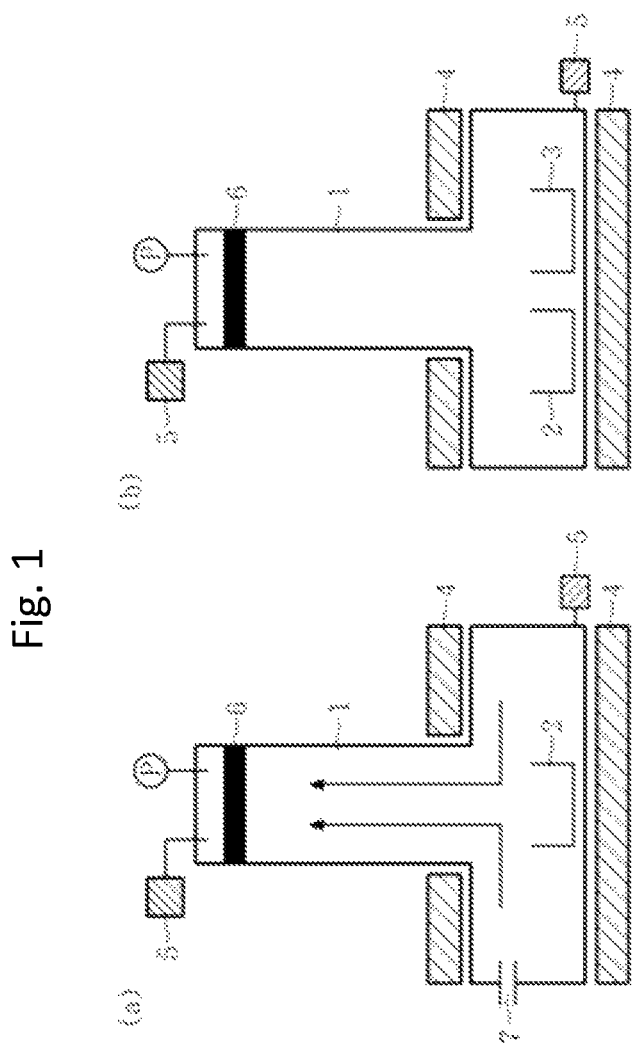
FIG. 1 is a schematic view illustrating a manufacturing apparatus of a silicon oxide-carbon composite according to an embodiment of the present invention.

FIG. 1 is a schematic view illustrating a manufacturing apparatus of a silicon oxide-carbon composite according to an embodiment of the present invention. Referring to FIG. 1, the manufacturing apparatus of the silicon oxide-carbon composite according to the embodiment of the present invention includes a reaction chamber 1, a reactor 2, an electric furnace 4, a vacuum pump 5, and a collector 6. The reactor 2 is included in the reaction chamber 1 and a mixture of silicon and silicon dioxide is included in the reactor 2. A temperature in the reaction chamber 1 may be increased to a reaction temperature by using the electric furnace 4, and a degree of vacuum in the reaction chamber 1 may be increased to obtain a high degree of vacuum by using the vacuum pump 5 (e.g., rotary pump, turbo molecular pump, etc.). A reducing atmosphere in the reaction chamber 1 may be created or formed by supplying a gas capable of creating a reducing atmosphere into the reaction chamber 1 through a gas nozzle 7 (see FIG. 1(a)) and may be created or formed by including one or more selected from the group consisting of active carbon, magnesium (Mg), aluminum (Al), tantalum (Ta), molybdenum (Mo), calcium (Ca), and zinc (Zn) in a separate container 3 in the reaction chamber 1 (see FIG. 1(b)). Silicon oxide manufactured in the reaction chamber 1 is $SiO_x$ (where $0<x<1$) and is collected in the collector 6 that is included in the reaction chamber 1.

In the method of manufacturing a silicon oxide-carbon composite according to an embodiment of the present invention, the mixing of the silicon and silicon dioxide may be performed by using a mechanical stirring device (e.g., paint shaker). However, the present invention is not limited thereto, and any method may be used so long as it may uniformly mix silicon and silicon dioxide. Silicon and silicon dioxide may be mixed in a molar ratio of 0.5:2 to 2:0.5. In the case that silicon and silicon dioxide are mixed in a molar ratio out of the above range, an amount of unreacted silicon or unreacted silicon dioxide may increase, and thus, productivity of silicon oxide may decrease. The mixture of silicon and silicon dioxide prepared as above may be included in the reaction chamber.

Also, the method of manufacturing a silicon oxide-carbon composite according to the embodiment of the present invention may include depressurizing the pressure of the reaction chamber to obtain a high degree of vacuum while increasing the temperature in the reaction chamber to a reaction temperature.

The reaction temperature may be in a range of 1300° C. to 1500° C. In the case that the reaction temperature is less than 1300° C., the reaction of silicon and silicon dioxide may decrease, and thus, the productivity of silicon oxide may decrease. In the case in which the reaction temperature is greater than 1500° C., silicon and silicon dioxide may be melted. Also, the reaction temperature may be held for 2 hours to 4 hours. The reason for limiting the holding time at the reaction temperature may be the same as that for limiting the reaction temperature.

In the method of manufacturing a silicon oxide-carbon composite according to the embodiment of the present invention, the high degree of vacuum may be in a range of $10^{-4}$ torr to $10^{-1}$. The high degree of vacuum may be formed by using a rotary pump and a turbo molecular pump. However, the present invention is not limited thereto. Since the reactivity may be thermodynamically high and a low-temperature reaction may be possible at a high degree of vacuum, it may be advantageous to maintain the high degree of vacuum. In the case that the high degree of vacuum is greater than $10^{-1}$ torr, the reaction of silicon and silicon dioxide may decrease, and thus, the productivity of silicon oxide may decrease and an amount of oxygen in silicon oxide may increase. The attainment of a degree of vacuum of less than $10^{-4}$ torr may not be facilitated in terms of equipment and process.

According to an embodiment of the present invention, the high degree of vacuum may be maintained until the reaction of silicon and silicon dioxide is completed, and the gas capable of creating a reducing atmosphere may be continuously injected into one side of the reaction chamber and continuously removed from another side of the reaction chamber.

The gas capable of creating a reducing atmosphere may be supplied into the reaction chamber at a flow rate of 1 standard cubic centimeter per minutes (sccm) to 1,000 sccm. In the case that the flow rate is less than 1 sccm, a reducing atmosphere may not be created, and thus, the amount of oxygen in silicon oxide may increase. In the case in which the flow rate is greater than 1,000 sccm, an excessive amount of gas may be supplied, and thus, a manufacturing process may be inefficient.

Also, the gas capable of creating a reducing atmosphere may include one or more selected from the group consisting of $H_2$, $NH_3$, and CO, and a mixed gas of an inert gas and $H_2$, $NH_3$, or CO. $H_2$, $NH_3$, or CO may be included in an amount of 1 vol % to 5 vol % based on the mixed gas.

It may be desirable for the reduction of the amount of oxygen to maintain the gas capable of creating a reducing atmosphere until the reaction is completed. The gas capable of creating a reducing atmosphere may be a $H_2$-containing gas including $H_2$ in an amount of 2 vol % to 5 vol %. In the method of manufacturing a silicon oxide-carbon composite according to the embodiment of the present invention, the reducing atmosphere may be created or formed by supplying the gas capable of creating a reducing atmosphere into a chamber, and may be created or formed by including a material, such as active carbon, in a separate container in the chamber.

The reducing atmosphere may be formed by one or more selected from the group consisting of active carbon, magnesium, aluminum, tantalum, molybdenum, calcium, and zinc, which are included in the separate container in the reaction chamber.

The gas capable of creating a reducing atmosphere or the material, such as active carbon, that is included in the separate container in the reaction chamber may be reacted with oxygen during the reaction of silicon and silicon dioxide to reduce the amount of oxygen that is included in the silicon oxide manufactured.

In particular, according to an embodiment of the present invention, a high degree of vacuum of $10^{-4}$ torr to $10^{-1}$ torr is maintained until the reaction is completed while continuously injecting and flowing a $H_2$-containing gas, and thus, the amount of oxygen in silicon oxide may be effectively controlled to be less than 1 based on silicon (Si) atoms. Also, the method of manufacturing a silicon oxide-carbon composite according to the embodiment of the present invention may include coating the surface of silicon oxide with carbon.

The carbon coating may be performed by including performing a heat treatment after mixing silicon oxide with a carbon precursor. Any carbon precursor may be used without limitation so long as it may form carbon by a heat treatment, and for example, pitch or a hydrocarbon-based material may be used. Examples of the hydrocarbon-based material may be any one selected from the group consisting of furfuryl alcohol, glucose, sucrose, a phenol-based resin, a phenol-based oligomer, a resorcinol-based resin, a resorcinol-based oligomer, a phloroglucinol-based resin, a phloroglucinol-based oligomer, and an unsaturated hydrocarbon gas, such as ethylene, propylene, or acetylene, or a mixture of two or more thereof.

The heat treatment for the carbon coating may be performed in a temperature range of 200° C. to 1,000° C. An amount of the carbon coating may be in a range of 1 wt % to 30 wt % based on a total weight of the silicon oxide. In the case that the amount of the carbon coating is less than 1 wt %, a uniform coating layer may not be formed, and thus, electrical conductivity may decrease. In the case in which the amount of the carbon coating is greater than 30 wt %, an additional irreversible reaction may occur due to the conductive coating layer, and thus, discharge capacity may be significantly decreased. The carbon coating is not limited thereto, and any method may be used so long as it may coat the surface of silicon oxide with carbon.

According to an embodiment of the present invention, the method may provide a silicon oxide-carbon composite including silicon oxide and a carbon coating layer on a surface of the silicon oxide, wherein a ratio of a maximum height ($h_2$) of a peak in a 2 theta range of 40° to 60° to a maximum height ($h_1$) of a peak in a 2 theta range of 15° to 40° in a X-ray diffraction (XRD) pattern satisfies $0.40 \leq h_2/h_1 \leq 1.5$.

Also, in the silicon oxide-carbon composite according to an embodiment of the present invention, the ratio of the maximum height ($h_2$) of the peak in the 2 theta range of 40° to 60° to the maximum height ($h_1$) of the peak in the 2 theta range of 15° to 40° in a XRD pattern of the silicon oxide-carbon composite may satisfy $0.45 \leq h_2/h_2 \leq 0.8$.

According to an embodiment of the present invention, the $h_2/h_1$ may affect an amount of oxygen (x) of the silicon oxide-carbon composite. For example, in the case that the ratio of the maximum height ($h_2$) of the peak in the 2 theta range of 40° to 60° to the maximum height ($h_1$) of the peak in the 2 theta range of 15° to 40° is less than 0.40, the amount of oxygen in silicon oxide may be greater than 1 based on Si atoms. As a result, an initial efficiency of a secondary battery may decrease. The ratio greater than 1.5 may not be obtained.

For example, XRD measurement conditions are as follows:

A silicon oxide-carbon composite is ground and measured with an X-ray diffractometer (Bruker AXS D-4-Endeavor XRD). Applied voltage and applied current may be respectively set as 40 KV and 40 mA. A measurement range of 2 theta is between 10° and 90°, and the XRD measurement may be performed by step scanning at an interval of 0.05°. In this case, a variable divergence slit (6 mm) may be used and, in order to reduce a background noise due to a polymethyl methacrylate (PMMA) holder, a large PMMA holder (diameter=20 mm) may be used. An intensity ratio of a peak in a range of 40° to 60° to a peak in a range of 15° to 40° may be obtained by using an EVA program (Bruker Corporation).

The silicon oxide-carbon composite may be amorphous. When compared to a crystalline silicon oxide-carbon composite during the XRD measurement of an amorphous silicon oxide-carbon composite, components of the crystalline silicon oxide-carbon composite may appear as peaks. However, in the amorphous silicon oxide-carbon composite, peaks of a trace material may not appear. That is, a noise reduction effect may be obtained, in which unnecessary peaks are removed because the peaks of the trace material do not appear in the XRD measurement.

In an amorphous silicon oxide-carbon composite according to an embodiment of the present invention, a full width at half maximum (FWHM) of the maximum peak in the 2 theta (θ) range of 15° to 40° in a XRD (Bruker AXS D-4-Endeavor XRD) pattern of the amorphous silicon oxide-carbon composite may be in a range of 7° to 15°, for example, 9° to 13°, and a FWHM of the maximum peak in a 2θ range of 40° to 60° may be in a range of 5° to 13°, for example, 8° to 10°.

In the present invention, the FWHM quantifies a peak width at a half position of the maximum intensity of the peak in a 2 theta range of 15° to 40° or 40° to 60°, which is obtained by the XRD of the amorphous silicon oxide-carbon composite.

The FWHM may be represented as degrees (°), i.e., the unit of 2 theta, and the higher the crystallinity of the silicon oxide-carbon composite is, the lower the value of the FWHM may be.

In the silicon oxide-carbon composite, an average particle diameter of silicon oxide may be in a range of 100 nm to 100 μm. However, the present invention is not limited thereto.

In the silicon oxide-carbon composite according to the embodiment of the present invention, silicon oxide may be $SiO_x$ (where $0<x<1$). Also, silicon in the silicon oxide may be crystalline or amorphous. In the case that the silicon included in the silicon oxide is crystalline, a crystal size of the silicon is 300 nm or less, may be 100 nm or less, and for example, may be in a range of 0.05 nm to 50 nm. In this case, the crystal size may be measured by XRD analysis or an electron microscope (e.g., scanning electron microscope (SEM) and transmission electron microscope (TEM)).

Silicon particles generally used may accompany very complex crystal changes in reactions which electrochemically absorb, store, and release lithium atoms. Composition and crystal structure of the silicon particles change to silicon (Si) (crystal structure: Fd3m), LiSi (crystal structure: I41/a), $Li_2Si$ (crystal structure: C2/m), $Li_7Si_2$ (Pbam), and $Li_{22}Si_5$ (F23) as the reactions which electrochemically absorb, store, and release lithium atoms proceed. Also, a volume of the silicon particle expands to about 4 times according to the complex changes in the crystal structure. However, since the reaction between $SiO_x$ according to the embodiment of the present invention and lithium atoms may be performed while maintaining the structure of $SiO_x$ and the range of x of $SiO_x$ is less than 1, the amount of oxygen may be decreased. Thus, the initial efficiency of the secondary battery may increase.

The silicon oxide-carbon composite according to the embodiment of the present invention includes a carbon coating layer on silicon oxide. Thus, when the silicon oxide-carbon composite is used as an anode active material, the form of the anode active material may not only be stably maintained without breakage during rolling due to improved mechanical properties, but also electrical conductivity may be further improved by including the carbon coating layer having excellent conductivity on the outside of the silicon oxide.

A thickness of the carbon coating layer may be in a range of 5 nm to 100 nm, for example, 5 nm to 50 nm. In the case that the thickness of the carbon coating layer is less than 5 nm, an effect of increasing the electrical conductivity due to the carbon coating layer may be insignificant, and the initial efficiency may decrease due to high reactivity with an electrolyte when applied as an anode active material. In the case in which the thickness of the carbon coating layer is greater than 100 nm, since the thickness of the amorphous carbon layer is excessively increased, the mobility of lithium ions may be restricted to increase the resistance, and since the surface may become hard, difficulties in electrode processing may occur.

Also, the present invention may provide an anode active material including the silicon oxide-carbon composite.

Furthermore, the present invention provides a secondary battery including a cathode including a cathode active material; a separator; an anode including the anode active material; and an electrolyte.

Since the secondary battery according to an embodiment of the present invention may include an anode active material including the silicon oxide-carbon composite, the initial efficiency of the secondary battery may be improved. Specifically, in the case that a ratio of the maximum height ($h_2$) of the peak at the 2 theta of 52° to the maximum height ($h_1$) of the peak at the 2 theta of 25° in a XRD pattern of the silicon oxide-carbon composite satisfies $0.40 \leq h_2/h_1 \leq 1.5$, the initial efficiency of the secondary battery may be in a range of 67% to 85%. Also, in the case in which the ratio of the maximum height ($h_2$) of the peak at the 2 theta of 52° to the maximum height ($h_1$) of the peak at the 2 theta of 25° in a XRD pattern of the silicon oxide-carbon composite satisfies $0.45 \leq h_2/h_1 \leq 0.8$, the initial efficiency of the secondary battery may be in a range of 72% to 85%.

For example, the anode may be prepared by coating an anode current collector with a mixture of an anode active material, a conductive agent, and a binder, and then drying the coated anode current collector. If necessary, a filler may be further added. The cathode may also be prepared by coating a cathode current collector with a cathode active material and drying the coated cathode current collector.

The separator is disposed between the cathode and the anode, and a thin insulating film having high ion permeability and mechanical strength may be used as the separator. Since the current collectors, electrode active materials, conductive agent, binder, filler, separator, electrolyte, and lithium salt are known in the art, the detailed descriptions thereof are omitted in the present specification.

The separator is disposed between the cathode and the anode to form a battery structure, the battery structure is wound or folded to put in a cylindrical battery case or prismatic battery case, and then a secondary battery is completed when the electrolyte is injected thereinto. Also, the battery structure is stacked in a bi-cell structure, impregnated with the electrolyte, and a secondary battery is then completed when the product thus obtained is put in a pouch and sealed.

Hereinafter, the present invention will be described in detail, according to specific examples. The invention may, however, be embodied in many different forms and should not be construed as being limited to the embodiments set forth herein.

EXAMPLE 1

Manufacture of Silicon Oxide-Carbon Composite

Manufacture of Silicon Oxide
40 g of Si and 86 g of $SiO_2$ were put in a bottle and completely mixed by a pain shaker at a rate of 300 rpm for 3 hours or more. Next, an alumina boat containing 12.5 g of the mixture of Si and $SiO_2$ was placed in an alumina inner tube having one end blocked, which was placed in an alumina outer tube of a reactor. It was heated to 1400° C. while increasing the degree of vacuum of the reactor by operating a rotary pump and a turbo molecular pump. In this case, the temperature was increased from room temperature to 800° C. for hour and 30 minutes and from 800° C. to 1400° C., i.e., a reaction temperature, for 2 hours and 30 minutes. The reaction was performed at 1400° C. for 3 hours after the temperature reaches the reaction temperature. A mixed gas of $H_2/N_2$ ($H_2$: 2%) was supplied at a flow rate of 800 sccm and the pressure in this case was $1.2 \times 10^{-1}$ torr. The pressure was maintained at $1.2 \times 10^{-1}$ torr until the reaction was completed while continuously supplying the mixed gas of $H_2/N_2$. The sublimator was naturally cooled after the reaction was completed. When the temperature of the sublimator was 300° C. or less, the gas supply was stopped to manufacture silicon oxide.

Formation of Carbon Coating Layer on the Surface of Silicon Oxide
20 g of the silicon oxide thus manufactured was put in a rotary tube furnace and argon gas was introduced at a flow rate of 0.5 L/minute. Then, the temperature was increased to 800° C. at a heating rate of 5° C./minute. A carbon coating layer was formed on the surface of the silicon oxide by performing a heat treatment for 5 hours while rotating the rotary tube furnace at a rate of 10 rpm and respectively flowing argon gas and acetylene gas at a rate of 1.8 L/minute and 0.3 L/minute.

EXAMPLE 2

Manufacture of Silicon Oxide-Carbon Composite

A silicon oxide-carbon composite was manufactured in the same manner as in Example 1 except that 0.83 g of active carbon was put in an alumina boat instead of supplying a mixed gas of $H_2/N_2$ ($H_2$: 2%) and the pressure was decreased to $8.8 \times 10^{-2}$ torr.

COMPARATIVE EXAMPLE 1

Silicon oxide was manufactured in the same manner as in Example 1 except that a mixed gas of $H_2/N_2$ was not used, the pressure was decreased to $3.0 \times 10^{-1}$ torr while increasing the temperature, and a carbon coating layer was not formed on the surface of the silicon oxide.

<Preparation of Coin-Type Half Cell>

EXAMPLE 3

The silicon oxide-carbon composite manufactured in Example 1 as an anode active material, acetylene black as a conductive agent, and polyvinylidene fluoride as a binder were mixed at a weight ratio of 95:1:4 and the mixture was mixed with a N-methyl-2-pyrrolidone solvent to prepare a slurry. One surface of a copper current collector was coated with the prepared slurry to a thickness of 30 μm, dried and rolled. Then, an anode was prepared by punching into a predetermined size.

10 wt % fluoroethylene carbonate based on a total weight of an electrolyte solution was added to a mixed solvent, which includes 1.0 M $LiPF_6$ and an organic solvent prepared by mixing ethylene carbonate and diethyl carbonate at a weight ratio of 30:70, to prepare an non-aqueous electrolyte solution.

A lithium foil was used as a counter electrode, a polyolefin separator was disposed between both electrodes, and a coin-type half cell was then prepared by injecting the electrolyte solution.

EXAMPLE 4

A coin-type half cell was prepared in the same manner as in Example 3 except that the silicon oxide-carbon composite manufactured in Example 2 was used as an anode active material.

COMPARATIVE EXAMPLE 2

A coin-type half cell was prepared in the same manner as in Example 3 except that the silicon oxide manufactured in Comparative Example 1 was used as an anode active material.

EXPERIMENTAL EXAMPLE 1

X-Ray Diffraction Analysis

The silicon oxide-carbon composites manufactured in Examples 1 and 2 and the silicon oxide manufactured in Comparative Example 1 were ground and measured with an X-ray diffractometer (Bruker AXS D-4-Endeavor XRD). Applied voltage and applied current were respectively set as 40 KV and 40 mA. A measurement range of 2 theta was between 10° and 90°, and the XRD measurement was performed by step scanning at an interval of 0.05°. In this case, a variable divergence slit (6 mm) was used and, in order to reduce a background noise due to a polymethyl methacrylate (PMMA) holder, a large PMMA holder (diameter=20 mm) was used. An intensity ratio of the peak at 52° to the peak at 25° was obtained by using an EVA program (Bruker Corporation). Also, crystallinities of the silicon oxide-carbon composites manufactured in Examples 1 and 2 and the silicon oxide manufactured in Comparative Example 1 were identified. Full width at half maximum (FWHM) values of maximum peaks in the 2θ range of 15° to 40° and maximum peaks in the 2θ range of 40° to 60° in a XRD pattern are presented in Table 1 below.

TABLE 1

|  | $h_2/h_1$ | FWHM of maximum peak (15° to 40°) | FWHM of maximum peak (40° to 60°) |
| --- | --- | --- | --- |
| Example 1 | 0.45 | 11.22 | 8.55 |
| Example 2 | 0.45 | 10.79 | 8.64 |
| Comparative Example 1 | 0.24 | 9.65 | 7.50 |

Figure 2:
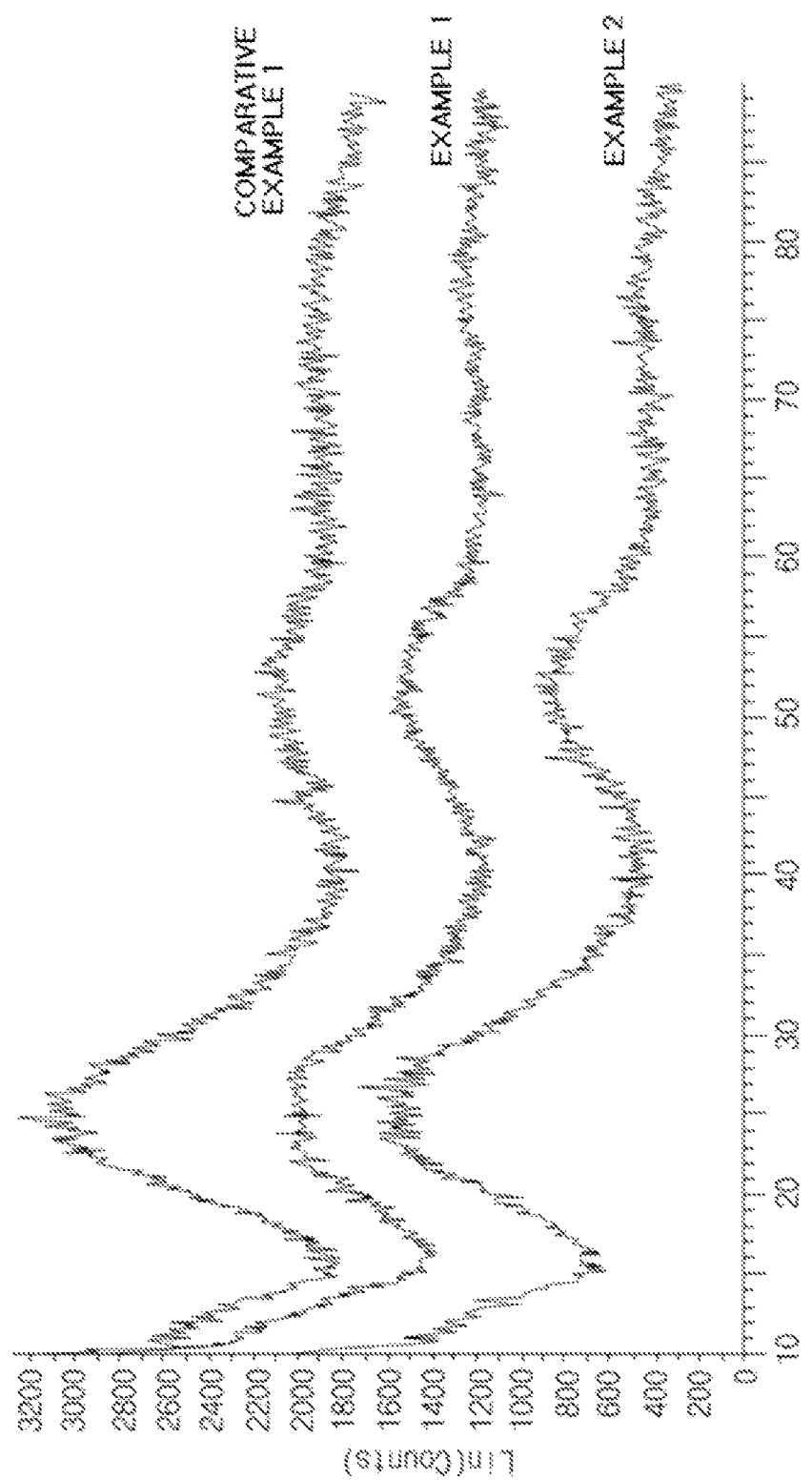
FIG. 2 illustrates the maximum height ($h_1$) of the peak at 25° and the maximum height ($h_2$) of the peak at 52° in a X-ray diffraction (XRD) pattern of silicon oxide-carbon composites manufactured in examples and silicon oxide manufactured in a comparative example according to the present invention.

FIG. 2 illustrates maximum height ($h_1$) of the peak at 25° and maximum height ($h_2$) of the peak at 52° in a XRD pattern of the silicon oxide-carbon composites manufactured in Examples 1 and 2 and the silicon oxide manufactured in Comparative Example 1 according to the present invention.

EXPERIMENTAL EXAMPLE 2

Initial Efficiency Measurement

In order to investigate initial efficiencies of the coin-type half cells prepared in Examples 3 and 4 and Comparative Example 2, the coin-type half cells prepared in Examples 3 and 4 and Comparative Example 2 were charged at 0.1 C to a voltage of 5 mV and charged to a current of 0.005 C at 5 mV under constant current/constant voltage (CC/CV) conditions at 23° C., and then discharged at 0.1 C to a voltage of 1.5 V under a constant current (CC) condition to measure the initial efficiencies. The results thereof are presented in Table 2 below.

TABLE 2

|  | Efficiency (1$^{st}$ Efficiency) |
| --- | --- |
| Example 3 | 72.65% |
| Example 4 | 72.65% |
| Comparative Example 2 | 59.72% |

As the result of measuring the initial efficiencies of Examples 3 and 4 and Comparative Example 2, the initial efficiencies of the secondary batteries prepared in Examples 3 and 4, in which the ratio of the maximum height of the peak at 52° to the maximum height of the peak at a 2θ of 25° was 0.45, were 72.65%, and the initial efficiency of the secondary battery prepared in Comparative Example 2, in which the height ratio was 0.24, was 59.72%. Therefore, it may be understood that the initial efficiencies of the secondary batteries of Examples 3 and 4 having a height ratio of 0.45 were significantly better than the initial efficiency of the secondary battery of Comparative Example 2.

REFERENCE NUMERALS

1: REACTION CHAMBER 2: REACTOR
3: CONTAINER 4: ELECTRIC FURNACE
5: VACUUM PUMP 6: COLLECTOR
7: GAS NOZZLE

INDUSTRIAL APPLICABILITY

According to the present invention, since an amount of oxygen in silicon oxide may be controlled by creating a reducing atmosphere and controlling a pressure, silicon oxide having a low amount of oxygen may be obtained. Thus, electrical conductivity may be further improved by forming a carbon coating layer on a surface of the silicon oxide having a low amount of oxygen.

Also, since an initial efficiency of a secondary battery may be predicted by calculating a height ratio in a specific range of 2 theta in a X-ray diffraction pattern of the silicon oxide-carbon composite, the present invention may be suitable for a secondary battery.

The invention claimed is:

1. A method of manufacturing a silicon oxide-carbon composite, the method comprising:
    mixing silicon and silicon dioxide in a molar ratio of 0.25:1 to 0.99:1 to be included in a reaction chamber;
    depressurizing a pressure of the reaction chamber to obtain a high degree of vacuum while increasing a temperature in the reaction chamber to a reaction temperature;
    reacting the mixture of silicon and silicon dioxide in a reducing atmosphere to produce a silicon oxide; and
    coating a surface of the silicon oxide manufactured by the reaction with carbon,
    wherein the reducing atmosphere is formed by including in a separate container in the reaction chamber one or more of a material selected from the group consisting of active carbon, magnesium, aluminum, tantalum, molybdenum, calcium, and zinc which reacts with oxygen in the chamber during the reaction of the silicon and the silicon dioxide to reduce the amount of oxygen within the chamber and thus reduce the amount of oxygen that is included in the silicon oxide, and wherein the high degree of vacuum is maintained until the reaction of silicon and silicon dioxide is completed.

2. The method of claim 1, wherein the reaction temperature is in a range of 1300° C. to 1500° C. and is held for 2 hours to 4 hours.

3. The method of claim 1, wherein the high degree of vacuum is in a range of $10^{-4}$ torr to $10^{-1}$ torr.

4. The method of claim 1, wherein the carbon coating is performed by including performing a heat treatment after mixing silicon oxide with a carbon precursor.

5. The method of claim 4, wherein the carbon precursor is pitch or a hydrocarbon-based material.

6. The method of claim 5, wherein the hydrocarbon-based material is any one selected from the group consisting of furfuryl alcohol, glucose, sucrose, a phenol-based resin, a phenol-based oligomer, a resorcinol-based resin, a resorcinol-based oligomer, a phloroglucinol-based resin, a phloroglucinol-based oligomer, and an unsaturated hydrocarbon gas, or a mixture of two or more thereof.

7. The method of claim 4, wherein the heat treatment is performed in a temperature range of 200° C. to 1,000° C.

8. The method of claim 1, wherein the material that reacts with oxygen is one or more of a material selected from the group consisting of active carbon, tantalum, molybdenum, and zinc.

* * * * *